(12) United States Patent
Burriss et al.

(10) Patent No.: US 10,459,734 B1
(45) Date of Patent: Oct. 29, 2019

(54) REGISTRY MANAGEMENT SYSTEM AND METHOD

(71) Applicant: EMC CORPORATION, Hopkinton, MA (US)

(72) Inventors: Michael L. Burriss, Raleigh, NC (US); Roko Peros, Holly Springs, NC (US); Jochen De Smet, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/082,571

(22) Filed: Mar. 28, 2016

(51) Int. Cl.
*G06F 9/44* (2018.01)
*G06F 9/4401* (2018.01)
*G06F 16/16* (2019.01)
*G06F 16/11* (2019.01)

(52) U.S. Cl.
CPC .......... *G06F 9/4406* (2013.01); *G06F 16/116* (2019.01); *G06F 16/16* (2019.01)

(58) Field of Classification Search
CPC ................. G06F 1/32; G06F 1/28; G06F 1/26
USPC ................................................. 713/300–399
See application file for complete search history.

(56) References Cited

U.S. PATENT DOCUMENTS

| | | | | |
|---|---|---|---|---|
| 6,170,055 | B1 * | 1/2001 | Meyer ................... | G06F 9/4406 713/2 |
| 6,832,371 | B1 * | 12/2004 | Hussey ................. | G06F 9/5011 713/100 |
| 6,934,956 | B1 * | 8/2005 | Allen ........................ | G06F 8/60 713/1 |
| 7,730,295 | B1 * | 6/2010 | Lee ........................... | G06F 8/65 713/1 |
| 8,463,951 | B1 * | 6/2013 | Priem ................... | G06F 9/4411 710/10 |
| 2003/0182323 | A1 * | 9/2003 | Demsky ................... | G06F 16/94 |
| 2008/0046709 | A1 * | 2/2008 | Wang ..................... | G06F 9/4403 713/2 |
| 2008/0184218 | A1 * | 7/2008 | Largman ............... | G06F 21/575 717/168 |

\* cited by examiner

*Primary Examiner* — Jaweed A Abbaszadeh
*Assistant Examiner* — Keshab R Pandey
(74) *Attorney, Agent, or Firm* — Brian J. Colandreo; Mark H. Whittenberger; Holland & Knight LLP (57) ABSTRACT

A method, computer program product, and computing system for defining a registry file for a data storage system. A boot operation mode is executed on the data storage system. The registry file is processed during the boot operation mode. A normal operation mode is executed on the data storage system. The registry file is processed during the normal operation mode.

21 Claims, 3 Drawing Sheets

REGISTRY MANAGEMENT SYSTEM AND METHOD

TECHNICAL FIELD

This disclosure relates to registry files and, more particularly, to registry files that are processed during boot time.

BACKGROUND

Storing and safeguarding electronic content is of paramount importance in modern business. Accordingly, various methodologies may be employed to protect such electronic content. One such methodology is to store the electronic content on and retrieve the electronic content from data arrays. Naturally, the proper operation of such data arrays is a prerequisite for providing reliable access to such electronic content. Often, these data arrays may operate in various modes, namely boot operation mode that is configured to allow technicians and/or administrators to address any issues with the data array before entering normal operation mode.

Unfortunately, the registry file that is utilized and/or modified during the boot operation mode is often separate and distinct from the registry file that is utilized and/or modified during normal operation mode. Accordingly, any changes that were made to the boot mode registry file in order to allow the data array to boot/function properly will need to be manually copied into the normal mode registry file that is processed during normal operation mode.

SUMMARY OF DISCLOSURE

In one implementation, a computer-implemented method is executed on a computing device and includes defining a registry file for a data storage system. A boot operation mode is executed on the data storage system. The registry file is processed during the boot operation mode. A normal operation mode is executed on the data storage system. The registry file is processed during the normal operation mode.

One or more of the following procedures may be included. Processing the registry file during the boot operation mode may include modifying the registry file to define one or more registry modifications. Modifying the registry file to define one or more registry modifications may include manually modifying the registry file to define one or more registry modifications. Modifying the registry file to define one or more registry modifications may include automatically modifying the registry file to define one or more registry modifications. Processing the registry file during the normal operation mode may include processing the one or more registry modifications during the normal operation mode. The registry file may be a database file. The registry file may be stored within persistent memory.

In another implementation, a computer program product resides on a computer readable medium and has a plurality of instructions stored on it. When executed by a processor, the instructions cause the processor to perform operations including defining a registry file for a data storage system. A boot operation mode is executed on the data storage system. The registry file is processed during the boot operation mode. A normal operation mode is executed on the data storage system. The registry file is processed during the normal operation mode.

One or more of the following procedures may be included. Processing the registry file during the boot operation mode may include modifying the registry file to define one or more registry modifications. Modifying the registry file to define one or more registry modifications may include manually modifying the registry file to define one or more registry modifications. Modifying the registry file to define one or more registry modifications may include automatically modifying the registry file to define one or more registry modifications. Processing the registry file during the normal operation mode may include processing the one or more registry modifications during the normal operation mode. The registry file may be a database file. The registry file may be stored within persistent memory.

In another implementation, a computing system including a processor and memory is configured to perform operations including defining a registry file for a data storage system. A boot operation mode is executed on the data storage system. The registry file is processed during the boot operation mode. A normal operation mode is executed on the data storage system. The registry file is processed during the normal operation mode.

One or more of the following procedures may be included. Processing the registry file during the boot operation mode may include modifying the registry file to define one or more registry modifications. Modifying the registry file to define one or more registry modifications may include manually modifying the registry file to define one or more registry modifications. Modifying the registry file to define one or more registry modifications may include automatically modifying the registry file to define one or more registry modifications. Processing the registry file during the normal operation mode may include processing the one or more registry modifications during the normal operation mode. The registry file may be a database file. The registry file may be stored within persistent memory.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
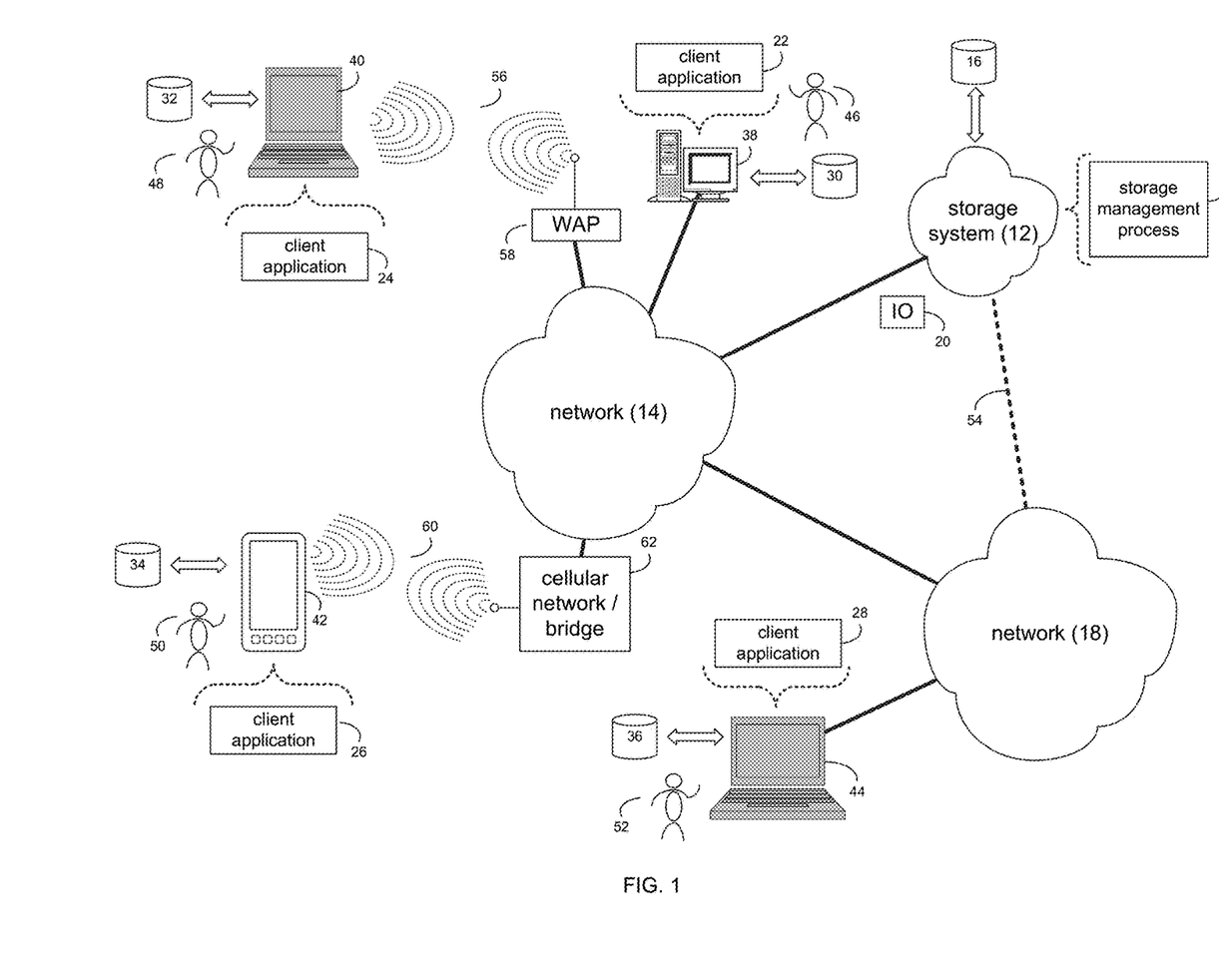
FIG. 1 is a diagrammatic view of a storage system and a registry management process coupled to a distributed computing network.

System Overview:

Referring to FIG. 1, there is shown registry management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™, Redhat Linux tm' Unix, or a custom operating system, for example.

The instruction sets and subroutines of registry management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server computer (not shown), a tablet computer (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
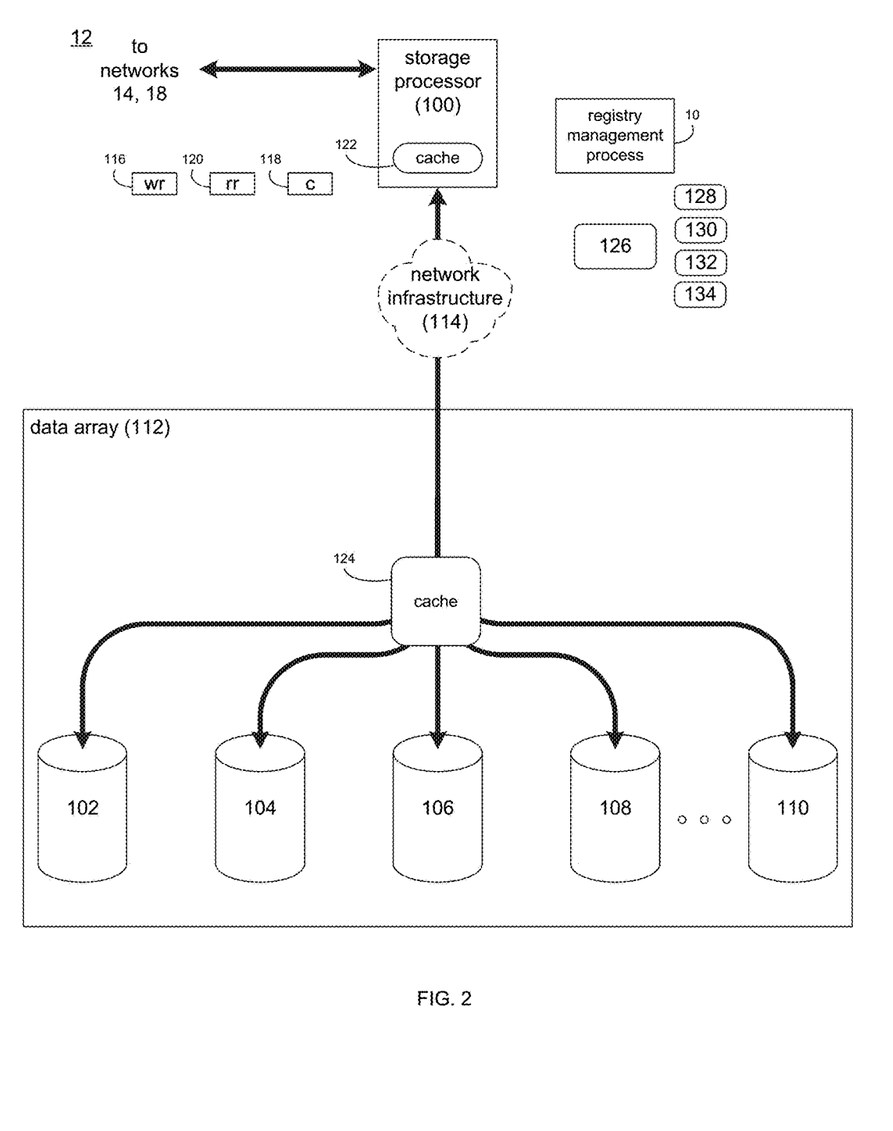
FIG. 2 is a diagrammatic view of the storage system of FIG. 1.

Data Storage System:

Referring also to FIG. 2, there is shown a general implementation of storage system 12. In this general implementation, storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of registry management process 10. The instruction sets and subroutines of registry management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of registry management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of registry management process 10 may be executed by one or more processors (not shown) and one or more memory architectures (not shown) included within data array 112.

The Registry Management Process:

Assume for the following example that data array 112 and/or storage processor 100 are configured to run in two distinct operational modes: namely boot operation mode and normal operation mode. For this example, assume that boot operation mode occurs when data array 112 and/or storage process 100 are booting/initializing. And once the boot operation mode is complete, data array 112 and/or storage processor 100 may enter normal operation mode.

Figure 3:
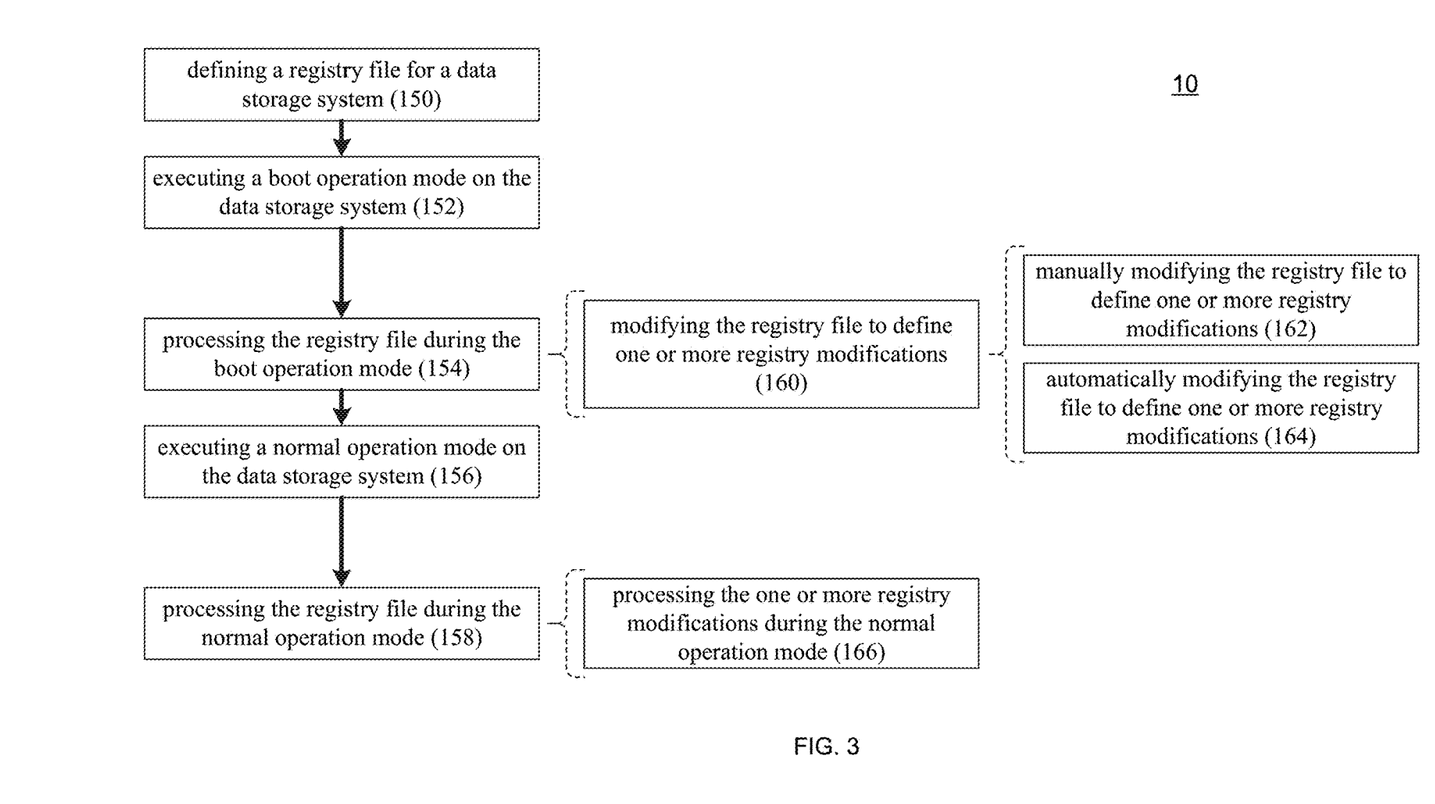
FIG. 3 is a flow chart of the registry management process of FIG. 1.

Referring also to FIG. 3 and for the following discussion, assume that registry management process 10 may be configured to execute on either or both of data array 112 and storage processor 100. During operation, registry management process 10 may define 150 a registry file (e.g., registry file 126) for a data storage system (e.g., data array 112 and/or storage processor 100). In this particular embodiment, registry file 126 may be utilized during both boot operation mode and normal operation mode of data array 112 and/or storage processor 100.

An example of registry file 126 may include but is not limited to a database file (e.g., a SQL database file), wherein registry file 126 may define e.g., the name and location of driver files to be loaded at boot time and the name and location of application program interfaces to be loaded at boot time. Registry file 126 may also define limits, trace files, and the location of configuration files. Registry file 126 may be utilized and/or processed during boot operation mode and normal operation mode. For example, one or more portions of registry file 126 may be processed during boot operation mode to load general drivers, application program interfaces and configuration files that may be needed during the booting/initialization of data array 112 and/or storage processor 100. Additionally, one or more portions of registry file 126 may be processed during normal operation mode to load/unload drivers, application program interfaces and configuration files that may be needed during the general operation of data array 112 and/or storage processor 100. Registry file 126 may be stored within persistent memory (e.g., flash memory, EEPROM, hard disk drives, or battery backed up RAM) so that registry file 126 may be changed/revised and such changes/revisions may be available the next time that registry file 126 is processed.

As discussed above, during initial startup and/or restart of data array 112 and/or storage processor 100, registry management process 10 may execute 152 a boot operation mode on the data storage system (e.g., data array 112 and/or storage processor 100) and may process 154 registry file 126 during this boot operation mode. When executing 152 the boot mode operation and processing 154 registry file 126, system diagnostics may be performed on data array 112 and/or storage processor 100 to ensure that data array 112 and/or storage processor 100 are functioning properly. Further and when processing 154 registry file 126 during this boot operation mode, drivers, application program interfaces, configuration files (and the like) may be loaded, thus allowing for e.g., communication with storage targets 102, 104, 106, 108, 110 (via disk drivers 128), communication with storage processor 100 and/or data array 112 (via network drivers 130), configuration of applications/devices (via configuration files 132), and interfacing with client applications 22, 24, 26, 28 (via application program interfaces 134).

Once boot operation mode is complete (and assuming that any diagnostic tests have passed, and any drivers, application program interfaces and configuration files have all properly loaded), registry management process 10 may execute 156 normal operation mode on the data storage system (e.g., data array 112 and/or storage processor 100) and may process 158 registry file 126 during the normal operation mode. Further and when processing 158 registry file 126 during this normal operation mode, drivers, application program interfaces, configuration files (and the like) may be loaded/unloaded as needed. For example, if an application is launched within the data storage system (e.g., data array 112 and/or storage processor 100) that e.g., generates a snapshot of data array 112, various drivers, application program interfaces, and configuration files may need to be loaded prior to generating the snapshot, wherein these drivers, application program interfaces, and configuration files may be unloaded after generating the snapshot.

As discussed above, once boot operation mode is complete, registry management process 10 may execute 156 a normal operation mode, but that is only if e.g., the diagnostic tests have passed, the drivers, application program interfaces and configuration files have all properly loaded, etc. In the event that some form of error occurred during boot operation mode (e.g., a diagnostic test failed, a driver, application program interface or configuration file failed to properly load, etc.), normal operation mode may not be executed 156 and the data storage system (e.g., data array 112 and/or storage processor 100) may remain in boot operation mode. In the event of such an error, when registry management process 10 processes 154 registry file 126 (during the boot operation mode), registry management process 10 may modify 160 registry file 126 to define one or more registry modifications. For example, assume that a configuration file needs to be loaded during boot mode operation of the data storage system (e.g., data array 112 and/or storage processor 100), wherein the configuration file was storage on a remote configuration file repository computer having an IP address of 192.168.1.220. However, due to an equipment failure, that configuration file is now located on a backup configuration file repository computer having an IP address of 192.168.1.221. Accordingly and during the startup of the data storage system (e.g., data array 112 and/or storage processor 100), when the portion of registry file 126 that locates the configuration file at 192.168.1.220 is processed, the boot mode operation may fail (or hang), as the remote computing device cannot be located. Accordingly, registry management process 10 may allow for the modification 160 of registry file 126 to define one or more registry modifications (that, in this example, locate the needed configuration file on a computing device having and IP address of 192.168.1.221).

When registry management process 10 modifies 160 registry file 126 to define these registry modifications, registry management process 10 may manually modify 162 registry file 126 (to define the registry modifications) or may automatically modify 164 registry file 126 (to define the registry modifications). For example, if registry management process 10 is not knowledgeable of the new location of this configuration file, registry management process 10 may manually modify 162 registry file 126 to identify the location of this needed configuration file at a computing device having the IP address of 192.168.1.221, by e.g., allowing an administrator to change the IP address from 192.168.1.220 to 192.168.1.221 within registry file 126. Alternatively, if registry management process 10 is knowledgeable of the new location of this configuration file, registry management process 10 may automatically modify 164 registry file 126 to change the location of this needed configuration file from 192.168.1.220 to 192.168.1.221.

Once the above-described modifications are made, the data storage system (e.g., data array 112 and/or storage processor 100) may be restarted, thus reinitiating the boot process. As discussed above, registry file 126 may be stored within persistent memory (e.g., flash memory, EEPROM, hard disk drives, or battery backed up RAM) so that the registry file may be changed/revised and such changes/revisions may be available the next time that registry file 126 is processed. Accordingly and assuming that there are no additional errors, the boot mode operation of the data storage system (e.g., data array 112 and/or storage processor 100) may be successfully completed and registry management process 10 may execute 156 normal operation mode on the data storage system (e.g., data array 112 and/or storage processor 100) and may process 158 registry file 126 during the normal operation mode. And when registry management process 10 processes 158 registry file 126 during the normal operation mode, registry management process 10 may process 166 the one or more registry modifications during the normal operation mode (namely and in this example, the modification to registry file 126 that properly locates the needed configuration file at 192.168.1.221. Therefore and through the use of a common registry file (e.g., registry file 126) that is processed 154, 158 by registry management process 10 during both the boot operation mode and the normal operation mode of the data storage system (e.g., data array 112 and/or storage processor 100), charges that were made to registry file 126 during boot operation mode debugging are available for use by registry management process 10 during normal operation mode.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   defining a registry file for a data storage system;
   executing a boot operation mode on the data storage system, wherein the boot operation mode is executed during initialization of the data storage system;
   processing the registry file during the boot operation mode;
   modifying the registry file to define one or more registry modifications while in the boot operation mode in response to an error occurring during the boot operation mode, wherein the one or more registry modifications includes, at least in part, identifying a new location of a configuration file, wherein if the new location of the configuration file is known, the one or more registry modifications is accomplished automatically, and wherein if the new location of the configuration file is not known then the one or more registry modifications is accomplished manually;

executing the normal operation mode on the data storage system in response to no errors occurring while processing the registry file during the boot operation mode; and processing the registry file during the normal operation mode, wherein processing the registry file during the normal operation mode includes generating a snapshot of at least one of a data array, driver, application program interface, and configuration file within the data storage system.

2. The computer-implemented method of claim 1 wherein modifying the registry file to define one or more registry modifications includes:
manually modifying the registry file to define one or more registry modifications.

3. The computer-implemented method of claim 1 wherein modifying the registry file to define one or more registry modifications includes:
automatically modifying the registry file to define one or more registry modifications.

4. The computer-implemented method of claim 1 wherein processing the registry file during the normal operation mode includes:
processing the one or more registry modifications during the normal operation mode.

5. The computer-implemented method of claim 1 wherein the registry file is a database file.

6. The computer-implemented method of claim 1 wherein the registry file is stored within persistent memory.

7. The computer-implemented method of claim 1 wherein processing the registry file during the normal operation mode includes at least one of loading at least one of the data array and driver prior to generating the snapshot of at least one of the data array and driver within the data storage system, and wherein processing the registry file during the normal operation mode includes unloading at least one of the data array and driver after generating the snapshot of at least one of a data array and driver within the data storage system.

8. A computer program product residing on a non-transitory computer readable medium having a plurality of instructions stored thereon which, when executed by a processor, cause the processor to perform operations comprising:
defining a registry file for a data storage system;
executing a boot operation mode on the data storage system, wherein the boot operation mode is executed during initialization of the data storage system;
processing the registry file during the boot operation mode;
modifying the registry file to define one or more registry modifications while in the boot operation mode in response to an error occurring during the boot operation mode, wherein the one or more registry modifications includes, at least in part, identifying a new location of a configuration file, wherein if the new location of the configuration file is known, the one or more registry modifications is accomplished automatically, and wherein if the new location of the configuration file is not known then the one or more registry modifications is accomplished manually;
executing the normal operation mode on the data storage system in response to no errors occurring while processing the registry file during the boot operation mode; and
processing the registry file during the normal operation mode, wherein processing the registry file during the normal operation mode includes generating a snapshot of at least one of a data array, driver, application program interface, and configuration file within the data storage system.

9. The computer program product of claim 8 wherein modifying the registry file to define one or more registry modifications includes:
manually modifying the registry file to define one or more registry modifications.

10. The computer program product of claim 8 wherein modifying the registry file to define one or more registry modifications includes:
automatically modifying the registry file to define one or more registry modifications.

11. The computer program product of claim 8 wherein processing the registry file during the normal operation mode includes:
processing the one or more registry modifications during the normal operation mode.

12. The computer program product of claim 8 wherein the registry file is a database file.

13. The computer program product of claim 8 wherein the registry file is stored within persistent memory.

14. The computer program product of claim 8 wherein processing the registry file during the normal operation mode includes loading the application program interface prior to generating the snapshot of the application program interface within the data storage system, and wherein processing the registry file during the normal operation mode includes unloading the application program interface after generating the snapshot of the application program interface within the data storage system.

15. A computing system including a processor and memory configured to perform operations comprising:
defining a registry file for a data storage system;
executing a boot operation mode on the data storage system, wherein the boot operation mode is executed during initialization of the data storage system;
processing the registry file during the boot operation mode;
modifying the registry file to define one or more registry modifications while in the boot operation mode in response to an error occurring during the boot operation mode, wherein the one or more registry modifications includes, at least in part, identifying a new location of a configuration file, wherein if the new location of the configuration file is known, the one or more registry modifications is accomplished automatically, and wherein if the new location of the configuration file is not known then the one or more registry modifications is accomplished manually;
executing a normal operation mode on the data storage system in response to no errors occurring while processing the registry file during the boot operation mode; and
processing the registry file during the normal operation mode, wherein processing the registry file during the normal operation mode includes generating a snapshot of at least one of a data array, driver, application program interface, and configuration file within the data storage system.

16. The computing system of claim 15 wherein modifying the registry file to define one or more registry modifications includes:
manually modifying the registry file to define one or more registry modifications.

17. The computing system of claim 15 wherein modifying the registry file to define one or more registry modifications includes:
   automatically modifying the registry file to define one or more registry modifications.

18. The computing system of claim 15 wherein processing the registry file during the normal operation mode includes:
   processing the one or more registry modifications during the normal operation mode.

19. The computing system of claim 15 wherein the registry file is a database file.

20. The computing system of claim 15 wherein the registry file is stored within persistent memory.

21. The computing system of claim 15 wherein processing the registry file during the normal operation mode includes loading the configuration file prior to generating the snapshot of the configuration file within the data storage system, and wherein processing the registry file during the normal operation mode includes unloading the configuration file after generating the snapshot of the configuration file within the data storage system.

\* \* \* \* \*